March 28, 1961  D. M. GORDON ET AL  2,976,743
CARBURETOR THROTTLE CONTROL

Filed March 30, 1953

INVENTOR.
DWIGHT M. GORDON &
ALFRED E. MAJEWSKI
BY George R. Ernst

ATTORNEY

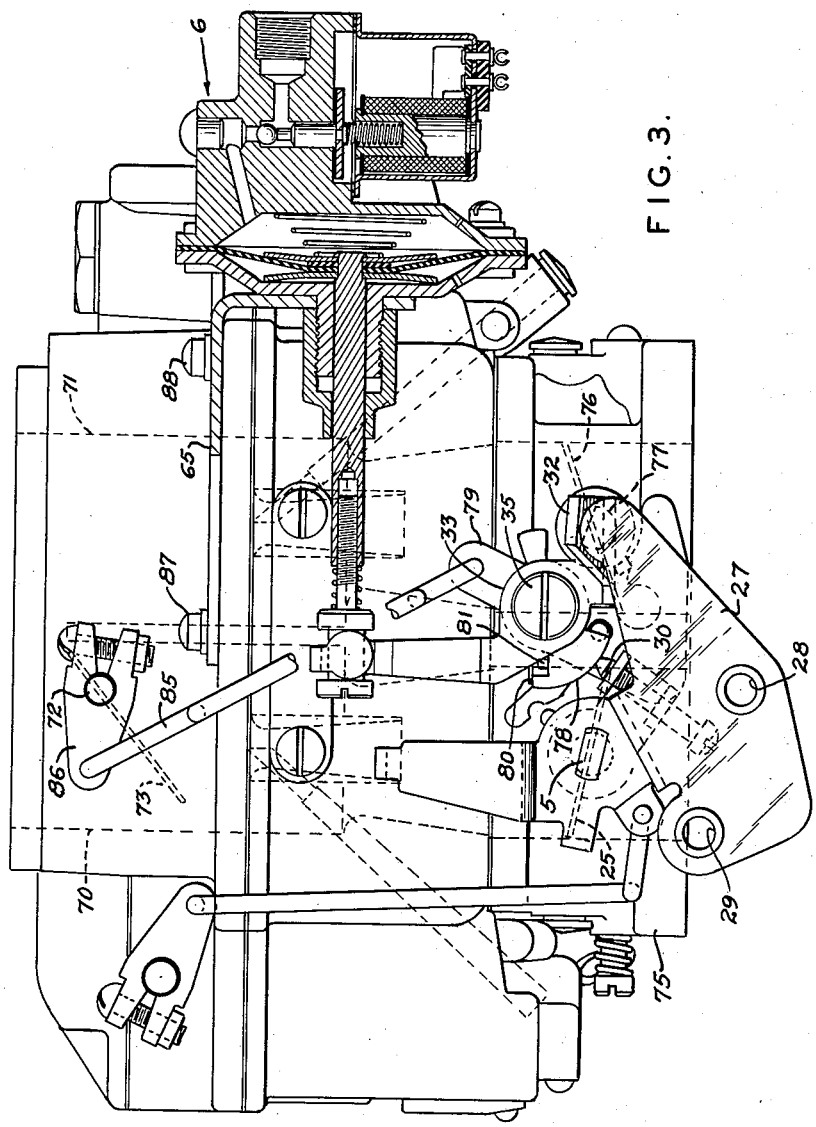

United States Patent Office 2,976,743
Patented Mar. 28, 1961

2,976,743

CARBURETOR THROTTLE CONTROL

Dwight M. Gordon, Detroit, and Alfred E. Majewski, Livonia, Mich.; said Majewski assignor to General Motors Corporation, Detroit, Mich., a corporation of Delaware; said Gordon assignor, by mesne assignments, to ACF Industries, Incorporated, New York, N.Y., a corporation of New Jersey Filed Mar. 30, 1953, Ser. No. 345,299

16 Claims. (Cl. 74—472)

This invention relates to an automatic control for the engine of a motor vehicle, which control is especially suited to properly adjust engine speed to accommodate both the needs of accessory devices driven from the engine and motor vehicle operating conditions. Generally speaking, the instrument for controlling engine speed is commonly regarded as the throttle of the carburetor, and most all carburetors are provided with a fast idle control for the throttle, which increases the idling speed of the engine during the warm-up period. More specifically, the present invention resides in another kind of throttle control system for the idling speed of an engine which is automatically operative to produce a faster than normal idle in case the engine transmission control is in neutral and the engine-driven accessory device or devices in normal operative condition. The novel system, preferably, permits a slower or so-called normal idle when the engine transmission control is in a "drive" position, or when the accessory device applies no load to the engine or is turned off.

Such a control can have many uses, and, by way of example, it is contemplated as suitable for an engine driving an accessory device such as a refrigerant compressor in a refrigerating system for air conditioning the motor vehicle. Where the compressor is driven by the engine through a belt or gearing, the torque produced by the engine must be sufficient to carry this extra load whenever the compressor is working.

Moreover, where the condenser for the air conditioning system is adjacent the engine radiator for utilizing the draft produced by operation of the engine-driven cooling fan, then, during low speed engine idling, the draft from the fan may be insufficient for proper cooling of the condenser and the engine radiator. It is well understood that, as condenser temperature rises, the efficiency of a refrigerating system is seriously lowered. Accordingly, it has been found that low engine speds are detrimental to proper operation of the air conditioning system, and that its capacity to produce cooling is seriously reduced at engine speeds under about 700 r.p.m.

Many motor vehicles are now equipped with automatic transmissions of one kind or another, but most of them have the tendency to cause "motor vehicle creep" at higher idling speeds. Thus, normal or slow engine idling speeds can be considered as incompatible with proper operation of the refrigerating machine of an air conditioning system, and high engine idling speeds can be considered as incompatible with satisfactory operation of automatic transmissions.

The present invention automatically provides suitable engine idling speeds for the accessory devices and for satisfactory operation of automatic transmissions. According to this invention, when the transmission is in neutral and the air conditioning control is in "on" position, engine idling speed is increased to around 700 to 800 r.p.m. On the other hand, when the transmission is shifted to a "drive" position, idling speed is reduced to about 400 r.p.m.

When the car has been parked in the hot sun, it is no longer necessary with this system to remain in the car after the engine is started and hold the accelerator open with one foot to speed up the engine in order to cool the car down. It is only necessary to start the engine, get out, and close the door, because engine speed is automatically adjusted with the transmission in neutral to produce quick cooling. The same is true when the car is standing motionless, because proper engine speed may be obtained to produce adequate cooling from the refrigerating unit by merely moving the shift lever to neutral, which is a perfectly normal procedure anyway, and desirable for other reasons in vehicles equipped with automatic transmission. These higher idling speeds are beneficial because cooling of the engine and radiator is improved by higher fan and water pump speeds. If the air conditioning system is turned off, then the control of the present invention becomes inactive, and control of engine idling speed is relinquished to the fast idle cam of the automatic choke control or the normal adjustment for throttle setting at idle. The accompanying drawings show one form of the instant invention for purposes of illustration.

Fig. 3 is a side elevational view of a multi-stage, multi-barrel carburetor with parts broken away to illustrate the control of this invention.

Figure 1:
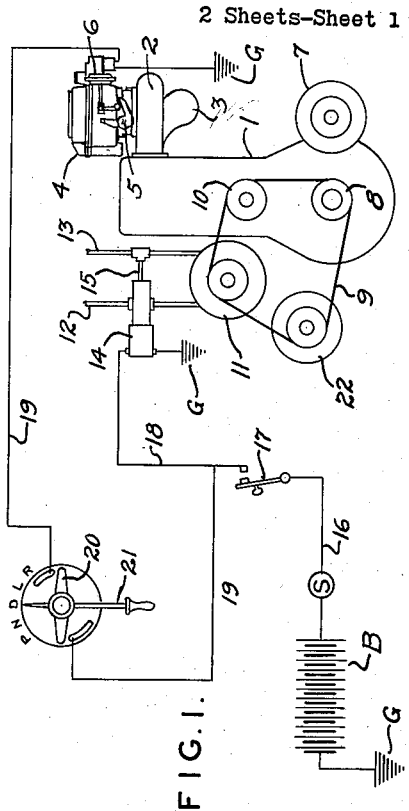
Fig. 1 is a diagrammatic view illustrating the interconnection of the control device illustrated in the following figures with the controls for the motor vehicle.

An automatic control according to the present invention is illustrated by the diagrammatic showing in Fig. 1. The system comprises an engine and transmission unit 1 with an exhaust manifold 3 and an intake manifold 2 mounting a carburetor generally indicated at 4. The carburetor is provided with a manually operated throttle valve on shaft 5 and an idling speed adjuster 6 adjacent the manually operated throttle shaft 5. Also mounted on the engine is the usual starter motor 7. On the end of the crank shaft of the engine 1 is a pulley 8 driving a V belt, or the like, 9, which is trained over a series of driven pulleys for operation of the water pump 10, the generator 22, and an accessory device 11, which is, in this case, a refrigerant compressor for an air conditioning system for cooling the motor vehicle. Since the remainder of the refrigerating unit for the air conditioning system forms no part of the present invention, it will not be illustrated and described here. For the purpose of this invention, it is sufficient to point out that the compressor 11 is provided with an intake line 12 and an exhaust line 13, which is connected to the condenser of a refrigeration unit which is part of the air conditioning system. The intake and exhaust lines 12 and 13 are interconnected by a bypass 15 controlled by a solenoid operated valve 14. When the air conditioning system is in its "on" or normally operative condition, solenoid valve 14 is closed, preventing the circulation of refrigerant through the bypass 15 from the exhaust line 13 to the intake 12, and thus refrigerant under pressure is delivered directly from the exhaust line 13 to the condenser and thence through the refrigerating apparatus. When the system is shut off, the solenoid valve is de-energized, opening the bypass through line 15, and the refrigerant is merely circulated through the compressor 11, exhaust line 13, and bypass 15 to intake line 12, back to the compressor.

In order to operate the solenoid valve 14, an electric circuit is provided from battery B, lead 16, manually or thermostatically operated control switch 17, lead 18, solenoid valve 14, and ground G. Since the battery B is also connected to ground, when switch 17 is closed the circuit is completed from the battery to the solenoid 14 for closing the bypass line 15 to operate the compressor 11, because, when the bypass 15 is closed, refrigerant will be pumped through line 12 from the evaporator of the refrigerating machine into exhaust line 13 leading to the condenser during engine operation.

In order to insure operation of the engine at a higher idling speed for driving the compressor 11 when the transmission is in neutral, a second control circuit is provided, comprising lead 19 connected with lead 18 through switch 20 operated by the transmission selector lever to idling speed adjuster 6, and thence to ground G. Switch 20 is so constructed that it will be closed when the transmission selector lever 21 is in the N or P positions, which are neutral transmission positions. When selector 21 is in the positions D, L or R, in which the transmission is conditioned for operation, switch 20 will be open.

With manual switch 17 closed during operation of the engine 1 and transmission selector lever 21 in the P or N position, the circuit through the lead 19 to the idling speed adjuster is closed, which will energize the adjuster 6 to provide a higher range of engine idling speeds. Conversely, with the transmission selector lever 21 in any one of the positions D, L or R, the circuit from the battery to the adjuster is open, de-energizing the adjuster to provide a normal range of idling speeds for proper transmission operation.

Figure 2:
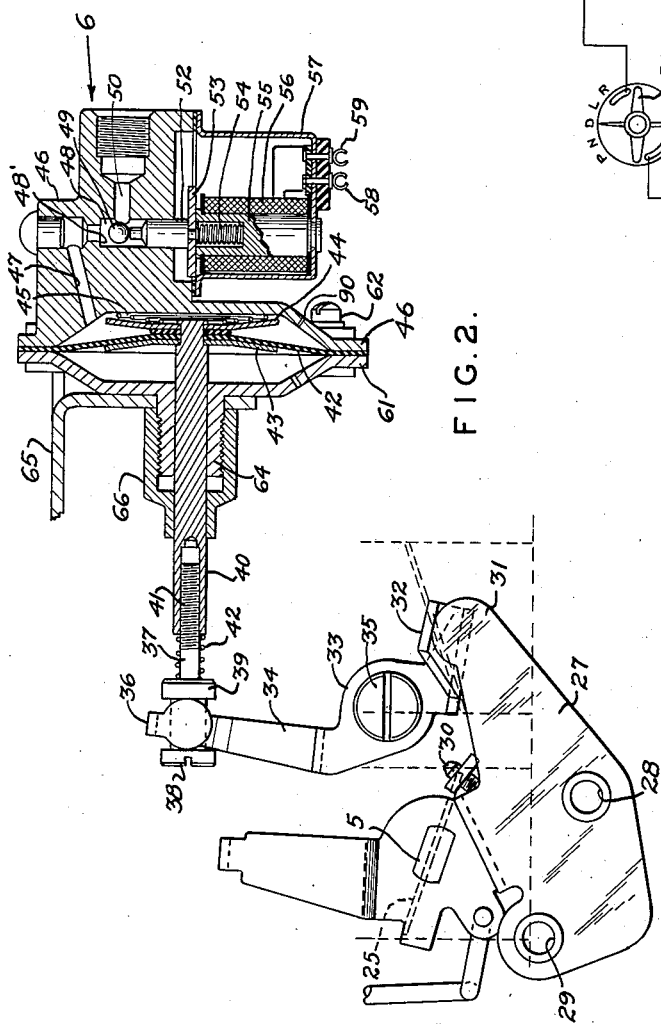
Fig. 2 is a detail view of the control mechanism illustrated in Fig. 3.

The throttle adjuster for varying the idling speeds may take many forms, but a preferred form of mechanism is illustrated in Fig. 2. In this figure, primary throttle shaft 5 controls a primary throttle valve 25, and rigidly mounted on throttle shaft 5 is a double crank arm 27 apertured at 28 and 29 for attachment by means of the usual linkage (not shown) to the accelerator pedal of the motor vehicle. This double lever 27 carries an idling adjusting speed screw 30 for cooperation with the fast idle cam in a manner later to be described. Lever 27 is provided with an extension 31 having a rounded upper surface for engagement with a horizontally extending ear 32 on lever 33 pivoted about the stud 35. This lever has an extension 34 with a bifurcated end 36, which straddles a shaft 37 between abutting flanges 38 and 39. Shaft 37 is adjustably mounted within a stem 40 by screw threads 41 and carries a coil spring 42 abutting flange 39 and the end of stem 40 for maintaining shaft 37 in any adjusted position with respect to the stem.

The opposite end of stem 40 has a reduced section providing a shoulder, and this reduced section carries a diaphragm 42 and its assembly between a shoulder and a headed-over portion on the end of the stem. Diaphragm 42 is thus firmly retained on the end of the stem 40 by the metal washers 43 and 44 of the diaphragm assembly. A coil compression spring 45 is compressed between the washer 44 and the diaphragm casing 46. Within the casing 46 is a passage 47 which connects the diaphragm chamber and valve chamber 48. A ball valve 49 co-operates with the seat 48' to seal the passage 47 to the diaphragm chamber. A passage 50 connects with the valve chamber and is threaded internally for a connection to the intake manifold 2 of the engine 1.

Ball valve 49 is provided with a solenoid control which, when energized, will allow the valve to lift from seat 52 slidably received within the valve chamber 48. Secured to the opposite end of the actuator 52 is an armature 53 which is spring-pressed in an upwardly direction by a coil spring 54 mounted in a cavity in core 55 of a solenoid 56. Spring 54 continually urges the actuator 52 in a direction to seat the ball valve 49. This force is opposed on energization of the solenoid 56, which attracts the armature 53, withdrawing the actuator from contact with valve 49. The solenoid is enclosed within a casing 57, which, in turn, carries two electric terminals 58 and 59 for connection with the lead 19 and the ground G, respectively. Diaphragm 42 has its periphery firmly engaged between casing 46 and casing 61, which are secured in abutting relation with the diaphragm by a series of screws 62. Casing 61, in turn, has a threaded nipple 64 through which the stem 40 projects, and this nipple, in turn, carries a bracket 65 firmly secured on the nipple by a threaded sleeve 66.

In Fig. 3, the idling speed adjuster device described in Fig. 2 is shown mounted in operative relation with the carburetor described in the application of Dwight M. Gordon, Serial No. 275,060, filed March 6, 1952, now Patent No. 2,681,213 dated June 15, 1954. This carburetor has four barrels or mixture conduits, including two primary conduits 70 and two secondary conduits 71, all arranged compactly side by side in a single integrally formed carburetor. Barrels 70 have mounted therein a transverse shaft 72 carrying an unbalanced choke valve 73 which controls the entrance of air to the primary mixture conduits 70. The throttle body 75 of the carburetor mounts a pair of primary throttle valves 25 on throttle shaft 5, and a pair of secondary throttle valves 76 on a common throttle shaft 77. The secondary throttle shaft is operated in a sequential manner from the first throttle shaft 5, all in a manner well known and disclosed in the aforesaid application. The primary throttle shaft 5 is directly controlled by the double lever 27, as previously described. This lever carries the idle speed adjusting screw 30 for cooperation with a mechanism providing a fast idle during engine warm-up.

This mechanism for providing the usual fast idle comprises a stub shaft 35 pivotally mounting a fast idle cam 78 and its actuator 79, which are resiliently secured together by means of a torsion spring 80, so that a lug 81 on a part 79 bears against part 78 within a recess thereof. Part 78 is connected by way of a rod 85 with an arm 86 rigid with the choke shaft 72. Choke shaft 72 and choke valve 73 may be controlled by any suitable thermostat mechanism such as described in conjunction with the co-pending application above mentioned.

Also mounted on the stub shaft 35 is the lever 33 of the separate idling speed adjuster indicated as 6 in Figs. 1 and 2. Bracket 65 is secured to the body of the carburetor by a pair of screws 87 and 88. The interconnection of the idling speed adjuster 6 in this manner provides the primary throttles 25 with two independently acting throttle stop devices, one of which is temperature controlled by the choke valve, and the other actuated by motor vehicle control instrumentalities completely separate from the carburetor.

*Operation*

As long as the air conditioning system is inoperative, switch 17 remains open, solenoid valve 14 is also open, and refrigerant from the compressor merely circulates between the intake line 12 and the exhaust line 13 through the bypass 15. The idling speed of the engine under these conditions remains under the control of the fast idle cam and the automatic choke mechanism in the usual manner, and when the engine reaches operating temperature, the automatic choke mechanism rotates the fast idle cam 78 to a position where it is no longer contacted by the idle adjusting screw 30. Throttle 25 is thereby allowed to return to an adjusted position to permit the engine to idle at approximately 400 r.p.m.

Closing of the switch 17 energizes the solenoid 14, closing the bypass 15 between the exhaust line 13 and the intake line 12 to the compressor 11, placing a load on the compressor 11 to furnish the refrigerant at high pressure to the refrigerating unit of the air conditioning system by way of the usual condsenser (not shown). However, in order to produce effective cooling, it is necessary for the engine 1 to attain some predetermined speed from 700 to 800 r.p.m.; otherwise the compressor 11 will have too little output to produce sufficient cooling. In order to attain these speeds when the motor vehicle is not in motion, the transmission selector lever 21 may be moved to either of the neutral positions indicated as N and P, thus closing the switch 20 and energizing the circuit from the battery through ignition switch S, and leads 19 to the idling speed adjuster 6. The flow of current from the battery through the solenoid 55 will attract armature 53, withdrawing the valve follower 52 to open the valve and allow the manifold suction to act on the diaphragm 42, compressing spring 45 by moving stem 40 to the right. The actuation of the stem, in turn, rotates the lever 33 and opens the throttle 25 slightly by engagement of the ear 32 with the extension 31 on the double lever 27. This movement of lever 27 may be adjusted by means of the screw threads 41 on the shaft 37 to produce the desired throttle opening and idling speed of the engine 1.

With the switch 17 closed, either manually or thermostatically, the circuit to the idling speed adjuster is de-energized by movement of the transmission selector lever 21 to any one of the positions D, L or R, which positions correspond with transmission power transmitting conditions. When this circuit is de-energized, it also de-energizes solenoid 55 and spring 54, and raises the valve follower to force the ball valve 49 against its seat, thus shutting off the communication of suction in the manifold 2 with the diaphragm chamber. Leakage through the vent port 90 allows the spring 45 to move the stem 40 to the left, withdrawing the ear 32 from contact with the extension 31 of the throttle lever 27. Throttle valve 25 then closes to the dead-idle position, allowing the engine to idle at about 400 r.p.m., which is too slow under ordinary conditions to produce any "creep" of the motor vehicle when the transmission is in any one of the positions D, L or R.

A structure has been described which will carry out all of the objects of the invention, but it is contemplated that other modifications will occur to those skilled in the art which come within the scope of the appended claims.

We claim:

1. In a motor vehicle, an engine, devices separately connected to be driven from said engine, control instrumentalities for each of said devices, a carburetor for said engine, a throttle for said carburetor, a manual operator for said throttle, and an independent throttle adjustor including a movable throttle stop for varying the degree of throttle closing actuated from said control instrumentalities.

2. In a motor vehicle, an engine, devices separately connected to be driven from said engine, a pair of control instrumentalities for each of said devices, one of which has more than two selected positions, a carburetor for said engine, a throttle for said carburetor, a manual operator for said throttle, and an independent throttle adjustor including a movable throttle stop for limiting the degree of said throttle closing actuated by said pair of control instrumentalities in some of said selected positions of said one instrumentality.

3. In a motor vehicle, an engine, a throttle for said engine, an accessory device driven from said engine, a transmission selector lever, and an engine idling speed adjustor acting automatically in response to operation of said accessory device and in selected positions of said transmission selector lever to provide higher engine idling speeds required by operation of said accessory device comprising, an adjustor mechanism for setting the minimum opening of said throttle, and a means to determine the adjusted position of said adjustor mechanism, including a connection under control of said transmission selector lever and responsive to operation of said accessory device.

4. In a motor vehicle, an engine, a throttle for said engine, an accessory device driven from said engine, a control for said accessory device, a transmission selector lever, and an engine speed control adjustor acting automatically in response to operation of said control and said selector lever to provide a plurality of throttle settings when said engine is idling comprising, engine-powered means for positioning said throttle, a control circuit for said engine-powered means, and means to energize said circuit, including at least two switches connected in series relation in said circuit and operated by said control and said transmission selector lever.

5. In a motor vehicle, an engine, a throttle for said engine, an accessory device driven from said engine, a control for said accessory device, a transmission selector lever, and an engine speed control adjustor acting automatically in response to operation of said control and said selector lever to provide a plurality of throttle settings when said engine is idling comprising an adjustor mechanism for setting the minimum opening of said throttle, a means to determine the adjusted position for said adjustor mechanism including a connection under control of said transmission selector lever and responsive to operation of said control for said accessory device.

6. In combination, an engine, a transmission driven from said engine having means for establishing a plurality of power-transmitting conditions therein and at least one neutral transmission condition, a control for said transmission selectively operable to establish said last mentioned conditions, an accessory device driven from said engine, means providing a fast idle condition of said engine suitable for driving said accessory device and a normal idle condition for said engine suitable when said transmission is conditioned by said control to establish said power transmitting conditions in said transmission, and mechanism associated with said accessory device and said control and operable by the setting of said control from said power transmitting condition to said neutral condition of said transmission for providing said fast idle condition instead of said normal idle condition.

7. In combination, an engine, a transmission driven from said engine having means for establishing a plurality of power-transmitting conditions therein and at least one neutral transmission condition, a control for said transmission selectively operable to establish said last mentioned conditions, an accessory device driven from said engine, means providing a fast idle condition of said engine suitable for driving said accessory device and a normal idle condition for said engine suitable when said transmission is conditioned by said control to establish said power transmitting conditions in said transmission, and mechanism associated with said accessory device and said control and operable by the setting of said control from said power transmitting condition to said neutral condition of said transmission for actuating said means to provide a fast idle condition of said engine.

8. In a motor vehicle, an engine, an automatic transmission driven by said engine, a control selector lever for establishing a plurality of power transmitting conditions therein, and at least one neutral transmission condition, a compressor driven from said engine, a battery powered electric circuit, including a switch and an electrically operated valve for controlling the output of said compressor, a carburetor for said engine, a throttle in said carburetor, and a manual control in said vehicle for operating said throttle; the combination of an idle position adjuster device for said throttle, a control circuit for said adjuster device energized by said first-mentioned switch, and a second switch in said circuit between said first switch and said adjuster device connected to said transmission selector lever to be operated to close in said neutral transmission condition and open in said plurality of power transmitting conditions of said transmission.

9. In a motor vehicle, a carburetor, a throttle for said carburetor, and alternative means for adjusting the closed position of said throttle comprising a first means responsive to engine temperature and including a first movable throttle stop actuated by said first means, and a second means responsive to vehicle temperature and including a second movable throttle stop actuated by said second means.

10. In a carburetor, a mixture conduit, a throttle in said conduit, a manual operator for moving said throttle through a range of positions from dead idle to full open, and engine power operated means on said carburetor connected to said throttle for opening said throttle through a lesser range of positions from dead idle than said manual operator when engine power is applied to said power operated means.

11. In a carburetor, a mixture conduit, a throttle in said conduit, a manual operator for moving said throttle through a range of positions from dead idle to full open, and engine power operated means connected to said throttle for opening said throttle through a lesser range of positions from dead idle than said manual operator, said power operated means including a pressure actuated device connected to said carburetor posterior to the throttle.

12. In a carburetor, a mixture conduit, a throttle in said conduit, a manual operator for moving said throttle through a range of positions from dead idle to full open, and engine power operated means on said carburetor for operating said throttle through a lesser range of positions from dead idle than said manual operator including a fluid pressure actuated device, a control valve for said device, and a solenoid to operate said valve.

13. In a carburetor, a mixture conduit, a throttle in said conduit, a manual operator for moving said throttle through a range of positions from dead idle to full open, and engine power operated means on said carburetor for increasing the flow of mixture from said mixture conduit to increase engine speed independent of said manual operator when engine power is applied to said power operated means.

14. Apparatus for controlling the idling speed of the engine of an automotive vehicle comprising in combination, a carburetor for supplying a combustible mixture of fuel and air to said engine having a throttle valve for controlling the quantity of mixture supplied to the engine, means for moving the throttle toward open position for increasing the idling speed of the engine, a transmission control lever adjustable to neutral and to a plurality of driving positions and operable to bring about operation of said last-named means when the transmission control lever is moved to its neutral position, and means operable to return the throttle to its normal idling position when said lever is moved to any of its driving positions.

15. Apparatus for controlling the idling speed of the engine of an automotive vehicle comprising in combination, a carburetor for supplying a combustible mixture of fuel and air to said engine and having a throttle valve for controlling the quantity of mixture supplied to the engine, throttle operating means for moving the throttle toward open position for increasing the idling speed of the engine, a transmission control lever adjustable to neutral and driving positions, and means controlled jointly by said lever when in neutral position and by engine suction for controlling the operation of said throttle operating means.

16. Apparatus for controlling the idling speed of the engine of an automotive vehicle comprising in combination, a carburetor for supplying a combustible mixture of fuel and air to said engine having a throttle valve for controlling the quantity of mixture supplied to the engine, means for moving the throttle toward open position for increasing the idling speed of the engine, a transmission control level adjustable to neutral and driving positions, and means operable by said lever when moved to neutral position to cause operation of said means to move the throttle toward open position.

References Cited in the file of this patent

UNITED STATES PATENTS

| | | |
|---|---|---|
| 1,886,672 | Good | Nov. 8, 1932 |
| 1,938,968 | Michaud | Dec. 12, 1933 |
| 2,205,458 | Ball | June 25, 1940 |
| 2,446,352 | Winter | Aug. 3, 1948 |
| 2,597,606 | Winkler | May 20, 1952 |
| 2,612,965 | Christie | Oct. 7, 1952 |
| 2,623,617 | Snyder et al. | Dec. 30, 1952 |
| 2,762,235 | Olson et al. | Sept. 11, 1956 |
| 2,822,701 | Olson | Feb. 11, 1958 |

FOREIGN PATENTS

| | | |
|---|---|---|
| 618,720 | France | Dec. 20, 1956 |